Figure 2:
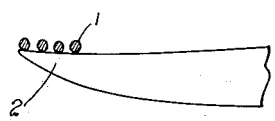

Oct. 29, 1929.  F. L. SCOTT  1,733,241
METHOD OF PRODUCING A HARD SURFACE ON TOOLS AND THE LIKE
Filed Aug. 6, 1928

FLOYD L. SCOTT  INVENTOR
BY
ATTORNEY

Patented Oct. 29, 1929

1,733,241

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

METHOD OF PRODUCING A HARD SURFACE ON TOOLS AND THE LIKE

Application filed August 6, 1928. Serial No. 297,877.

My invention pertains to means and methods of forming a hard cutting surface upon tools and the like.

It has for its object the production of a cutting and wearing surface upon tools subject to excessive erosion and to abrading action in use.

It is desired to produce a wearing surface which will be particularly resistant to wear in use and which may be applied to the surface of the tool in such a manner that it will not break or chip off from the blade surface of the tool.

The invention may be applied to various uses, but I contemplate illustrating its use on cutting tools employed in deep well drilling. It is now common to place hard materials upon the cutting portions of bits and drills, and this may be done by securing with the oxy-acetylene flame small particles of the hard material such as tungsten carbide or the like to the cutting edge by depositing about the particles a bond of steel or iron which holds the particles embedded therein like a diamond is held in a setting. The difficulty arising from this method is that, as the bond of welded metal wears away, the particles of hard material are released and drop out and are lost.

It is my object to alloy the hard material with the substance of the body of the cutting tool so that the surface of the hard particles are "wet" by the material of the blade and are thus cemented to and become a part of the blade itself so that the hard particles may not become lost.

In the drawing, the hard particles are shown as being fixed to the blade of a fish tail bit such as is commonly employed in well drilling.

Figure 3:
Figure 1:
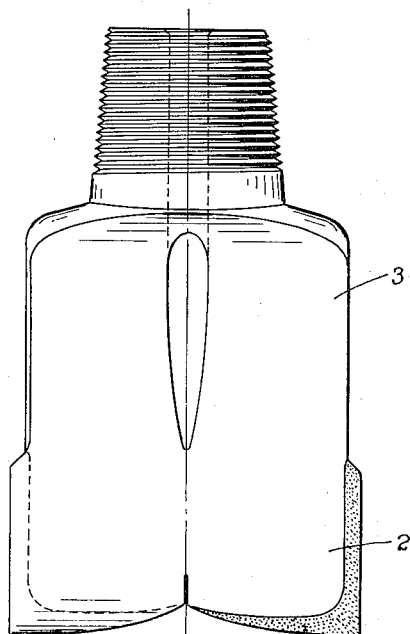

Fig. 1 illustrates such a tool with my hardened cutting surface applied thereto. Fig. 2 is an enlarged detail of a blade with the hard particles lying loosely thereon. Fig. 3 is a similar view showing said particles in position welded to the blade by my method.

I contemplate employing tungsten carbide or alloys containing tungsten carbide. This material has previously been used by taking fragments of the same about the size of a pea and flowing a medium hard carbon steel around the tungsten carbide, and thus secure the same in position. An oxy-acetylene torch is used, and as the heat thus generated will not melt the tungsten carbide which has a melting point of 5000° to 5500° F., it is left simply embedded in the steel with no bond connecting it to the blade.

In carrying out the invention I have found that by the use of the atomic hydrogen torch I can generate heat enough to melt the carbide itself with a reducing atmosphere, preventing combustion of the carbide. The tungsten carbide in the molten condition alloys readily with the blade of the cutter, while the hydrogen atmosphere surrounding the heated portion prevents oxidation of the carbon in the carbide. I am thus enabled to secure tungsten carbide to the cutting edge by means of a molecular bond, rather than a mechanical bond, secured when the oxy-acetylene torch is used.

In applying the tungsten carbide by this method, small particles 1, of the carbide having sizes ranging in the neighborhood of $\frac{1}{16}$ inch are spread in a thin line on the cutting edge 2 of the bit 3. The atomic hydrogen flame is then applied to these particles which are melted on their surfaces only.

The steel blade 2 below the particles becomes heated by the flame to a molten state, and readily combines with the molten surfaces of the tungsten carbide chips. This alloy of iron and tungsten carbide has the effect of "wetting" the surface of the carbide forming a molecular bond 4 indicated at Fig. 3.

The welder can readily tell when the process is complete by noting the surface produced. A rough pebbly surface is obtained, the roughness being due to the particles of carbide which have not been completely alloyed. The space between the particles of carbide is filled with a hard, tough, adhering layer of combined iron, tungsten and carbon.

I have found that best results are obtained when the tungsten-carbide is only partially melted. That portion which melts combines with the iron and has a hardness on Mohs scale somewhere in the neighborhood of 6 to 100

7. Since the usual hard formations encountered in rotary drilling are composed of sand and other materials having a hardness varying between 6 and 7, it can readily be seen that the iron-tungsten-carbon material cannot easily cut material having the hardness of quartz or silicates. The hardness of tungsten carbide, however, is in excess of 9.5 on Mohs scale of hardness and will readily cut quartz and even the crystal facets of carborundum manufactured in the electric furnace. It is advisable then to leave a portion of the tungsten carbide unalloyed so that it will retain its original hardness.

The method described above where the atomic hydrogen flame is used in application is simple in accomplishment and provides a thin, tough cutting edge because of the molecular bond secured, and lack of oxidation.

The further advantages will be apparent without further description.

What I claim as new is:

1. The method of producing a hard surface on iron and steel cutters comprising placing small particles of tungsten carbide upon the edge of said cutter, and partially melting said carbide and the body of said cutter and thus securing said carbide to said cutter by an alloy of tungsten carbide and iron.

2. The method of producing a hard surface on iron and steel cutters comprising placing small particles of tungsten carbide upon the said cutter, and partially melting said carbide and the body of said cutter in a reducing atmosphere and thus alloying a portion of said carbide with the iron of said cutter.

3. A method of producing a hard surface upon iron and steel cutters, comprising placing upon said surface a quantity of small particles of hard material containing tungsten carbide, partially melting said hard material in an atmosphere of hydrogen, and thus forming an alloy with the iron of said cutter.

4. A method of producing a hard surface upon iron or steel tools comprising placing particles of hard material containing tungsten carbide upon said surface, and melting a portion only of said particles, and thus forming an alloy of the molten carbide and the iron of said blade, as a bond for said carbide.

In testimony whereof, I hereunto affix my signature this the 28th day of July, A. D., 1928.

FLOYD L. SCOTT.